US011550286B2

(12) United States Patent
Nagata (10) Patent No.: US 11,550,286 B2
(45) Date of Patent: Jan. 10, 2023

(54) CONTROL APPARATUS, MONITORING METHOD, AND MONITORING PROGRAM (71) Applicant: OMRON Corporation, Kyoto (JP)

(72) Inventor: Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 83 days.

(21) Appl. No.: 16/641,249

(22) PCT Filed: Jan. 17, 2019

(86) PCT No.: PCT/JP2019/001248
§ 371 (c)(1),
(2) Date: Feb. 23, 2020

(87) PCT Pub. No.: WO2019/150970
PCT Pub. Date: Aug. 8, 2019

(65) Prior Publication Data
US 2020/0225632 A1 Jul. 16, 2020

(30) Foreign Application Priority Data

Feb. 5, 2018 (JP) .............................. JP2018-018118

(51) Int. Cl.
*G05B 19/05* (2006.01)
(52) U.S. Cl.
CPC ......... *G05B 19/054* (2013.01); *G05B 19/058* (2013.01); *G05B 2219/14055* (2013.01); *G05B 2219/14067* (2013.01)
(58) Field of Classification Search
None
See application file for complete search history.

(56) References Cited

U.S. PATENT DOCUMENTS 5,481,303 A * 1/1996 Uehara ................ H04N 1/2137
348/231.1
2002/0150049 A1* 10/2002 Collier .................... H04L 47/29
370/236
(Continued)

FOREIGN PATENT DOCUMENTS

JP S61-123944 A 6/1986
JP H06-350950 A 12/1994
(Continued)

OTHER PUBLICATIONS

English translation of the International Search Report("ISR") of PCT/JP2019/001248 dated Mar. 26, 2019.
(Continued)

*Primary Examiner* — Mohammad Ali
*Assistant Examiner* — David Earl Ogg
(74) *Attorney, Agent, or Firm* — Metrolex IP Law Group, PLLC (57) ABSTRACT A technique is desired that can output a warning to a user before a buffer of a controller runs out of a free space. A control apparatus includes a buffer for buffering log data sequentially generated, an interface unit connectable with an external storage device, a writing unit for sequentially reading the log data buffered to the buffer and sequentially writing the log data to the external storage device while the external storage device is connected to the interface unit, a monitoring unit for monitoring a free space of the buffer, and a warning unit for outputting a warning upon the free space falling below a prescribed value.

7 Claims, 9 Drawing Sheets (56) References Cited

U.S. PATENT DOCUMENTS

| | | | | |
|---|---|---|---|---|
| 2009/0228823 A1* | 9/2009 | Edwards | ............... | G06F 3/0653 715/772 |
| 2011/0035548 A1* | 2/2011 | Kimmel | .................. | G06F 3/061 707/823 |
| 2011/0296010 A1 | 12/2011 | Sasano et al. | | |
| 2012/0254517 A1* | 10/2012 | Jang | ....................... | G05B 19/05 711/103 |
| 2016/0004457 A1 | 1/2016 | Fields, Jr. et al. | | |

FOREIGN PATENT DOCUMENTS

| | | | |
|---|---|---|---|
| JP | H09-135335 | A | 5/1997 |
| JP | H11-024967 | A | 1/1999 |
| JP | 2005-108282 | A | 4/2005 |
| JP | 2006-246195 | A | 9/2006 |
| JP | 2007-096987 | A | 4/2007 |
| JP | 2010-176545 | A | 8/2010 |
| JP | 2010176545 | A * | 8/2010 |
| JP | 2011-254476 | A | 12/2011 |

OTHER PUBLICATIONS

Written Opinion("WO") of PCT/JP2019/001248 dated Mar. 26, 2019.
Office Action (JPOA) dated Aug. 3, 2021 in a counterpart Japanese patent application.
Extended European search report (EESR) dated Sep. 8, 2021 in a counterpart European patent application.

* cited by examiner

CONTROL APPARATUS, MONITORING METHOD, AND MONITORING PROGRAM

TECHNICAL FIELD

The present disclosure relates to a technique for monitoring a free space of a buffer in a control apparatus.

BACKGROUND ART

Factory automation (FA) systems that automate a production process are in widespread use in various production sites. The FA system is composed of various industrial drive apparatuses. Examples of the industrial drive apparatuses include a moving table for moving a workpiece, a conveyor for transporting the workpiece, and an arm robot for moving the workpiece to a predetermined destination. The drive apparatuses are controlled by an industrial control apparatus (hereinafter, also referred to as "controller"), such as a programmable logic controller (PLC) or a robot controller.

The controller saves a process record as log data in anticipation of the occurrence of an abnormal state. Since part of a storage area of the controller is used by a control program of the drive apparatus, the controller has a limited free space in the storage area. The log data is thus written to an external storage device, such as a memory card, which is connected to the controller.

For such a controller, Japanese Patent Laying-Open No. 2010-176545 (PTL 1) discloses a controller capable of logging data about a to-be-controlled apparatus in a memory card in accordance with logging settings stored in the memory card.

CITATION LIST

Patent Literature

PTL 1: Japanese Patent Laying-Open No. 2010-176545

SUMMARY OF INVENTION

Technical Problem

Since there is an upper limit to the storage capacity of the external storage device, a user needs to periodically replace the external storage device. While the external storage device is removed, the generated log data is stored in the buffer of the controller. However, since the storage capacity of the buffer is limited, the controller needs to discard log data if the buffer runs out of free space. The external storage device thus has to be replaced quickly. If the user prepares an external storage device after checking that the external storage device has run out of free space, it may take time to replace the external storage device.

The present disclosure has been made to solve the above problem, and an object in one aspect thereof is to provide a technique capable of outputting a warning to a user before a buffer of a controller runs out of free space.

Solution to Problem

In an example of the present disclosure, a control apparatus includes a buffer for buffering log data sequentially generated, an interface unit connectable with an external storage device, a writing unit for sequentially reading the log data buffered to the buffer and sequentially writing the log data to the external storage device while the external storage device is connected to the interface unit, a monitoring unit for monitoring a free space of the buffer, and a warning unit for outputting a warning upon the free space falling below a prescribed value.

According to this disclosure, the control apparatus can output a warning to the user before the buffer runs out free space. This allows the user to prepare a new external storage device before the buffer runs out of space area to quickly replace the external storage device with a new one. Consequently, a log data loss can be prevented.

In an example of the present disclosure, the warning unit intensifies a manner of outputting the warning as the free space decreases.

According to this disclosure, the user can intuitively grasp the free space of the buffer.

In one example of the present disclosure, the control apparatus further includes an internal storage device. While the external storage device is not connected to the interface unit, the writing unit sequentially reads the log data stored in the buffer and buffers the log data to the internal storage device.

According to this disclosure, the control apparatus can store log data in the internal storage device while the external storage device is not connected, thereby preventing a log data loss more reliably while the external storage device is removed.

In one example of the present disclosure, upon connection of a new external storage device to the interface unit, the writing unit writes the log data buffered to the internal storage device to the new external storage device.

According to this disclosure, the control apparatus can save the log data temporarily saved while the memory card is removed to a newly connected memory card.

In an example of the present disclosure, the warning includes at least one of a warning by light, a warning by sound, and a warning by notification.

According to this disclosure, when a warning is enabled by light or notification, the user can visually recognize that the buffer free space has decreased. When the warning is enabled by sound, the user can aurally recognize that the buffer free space has decreased.

In an example of the present disclosure, a method of monitoring a buffer included in a control apparatus includes: buffering log data sequentially generated to a buffer of the control apparatus; while an external storage device is connected to an interface unit of the control apparatus, sequentially reading the log data buffered to the buffer and sequentially writing the log data to the external storage device; monitoring a free space of the buffer; and outputting a warning upon the free space falling below a prescribed value.

According to this disclosure, a warning is output to the user before the buffer runs out of free space. This allows the user to prepare a new external storage device before the buffer runs out of space area to quickly replace the external storage device with a new one. Consequently, a log data loss can be prevented.

In another example of the present disclosure, a monitoring program for a buffer included in a control apparatus causes the control apparatus to perform: buffering log data sequentially generated to a buffer of the control apparatus; while an external storage device is connected to an interface unit of the control apparatus, sequentially reading the log data buffered to the buffer and sequentially writing the log data to the external storage device; monitoring a free space of the buffer; and outputting a warning upon the free space falling below a prescribed value.

According to this disclosure, a warning is output to the user before the buffer runs out of free space. This allows the user to prepare a new external storage device before the buffer runs out of space area to quickly replace the external storage device with a new one. Consequently, a log data loss can be prevented.

Advantageous Effects of Invention

In one aspect, a warning can be output to a user before the buffer of the controller runs out of free space.

DESCRIPTION OF EMBODIMENTS

Embodiments according to the present invention will now be described with reference to the drawings. In the following description, the same components and constitutional elements are denoted by the same references, which applies to their names and functions. Detailed description thereof will thus not be repeated.

A. Application Example

Figure 1:
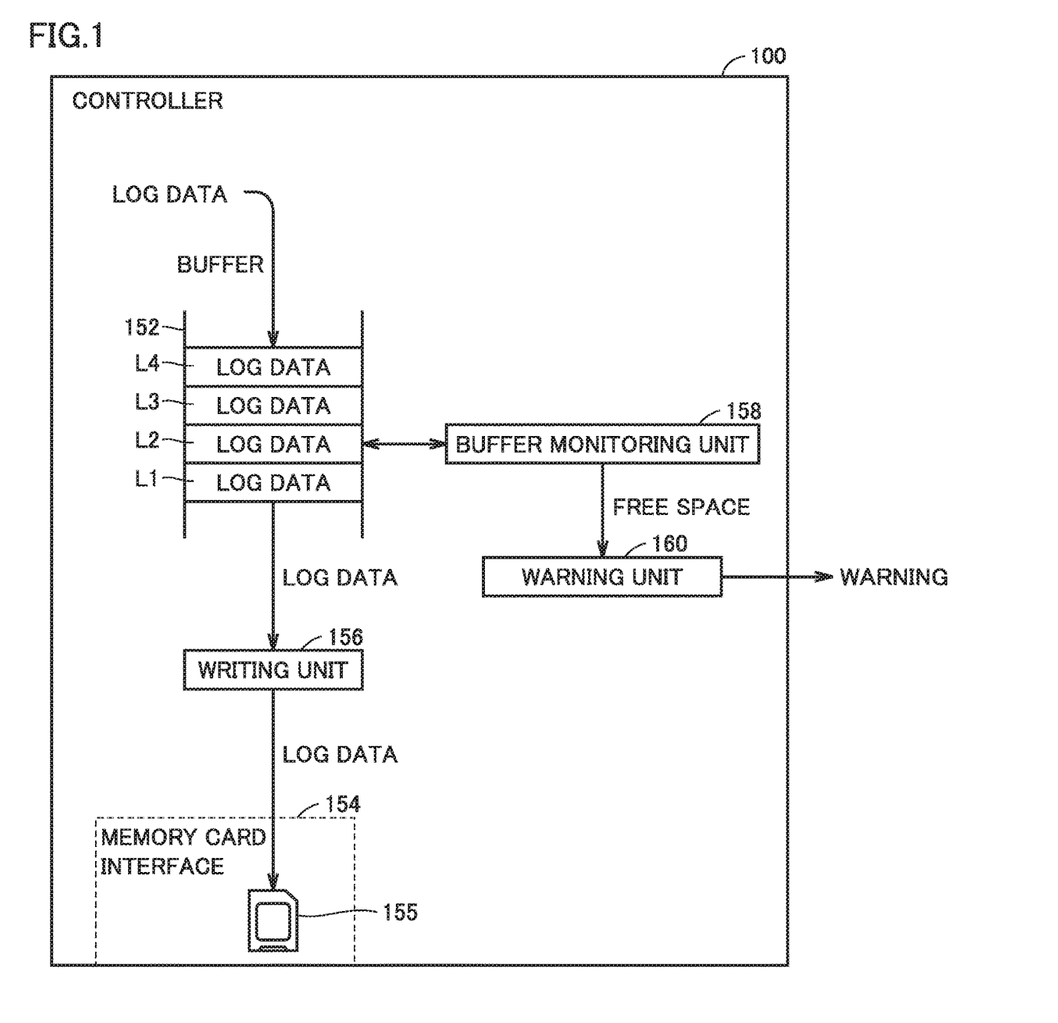
FIG. 1 shows a configuration example of a controller according to an embodiment.

An application example of the present invention will be described with reference to FIG. 1. FIG. 1 shows a configuration example of a controller 100 according to an embodiment.

Controller 100 is an apparatus for controlling industrial drive apparatuses. Examples of the targets to be driven by controller 100 include a robot controller that controls an arm robot, a servo motor that controls a servo motor, a vision sensor for taking an image of a workpiece, and any other industrial apparatus used in a production process.

As shown in FIG. 1, controller 100 includes a buffer 152, a memory card interface 154 (interface unit), a writing unit 156, a buffer monitoring unit 158, and a warning unit 160.

Buffer 152 is, for example, a volatile storage area in controller 100. In one example, buffer 152 is a storage area, such as a random access memory (RAM) or a cache memory. Buffer 152 buffers log data sequentially generated.

"Log data" herein refers to data recorded when controller 100 has performed a prescribed process. Log data may include an abnormal log (operation log) generated at the time of occurrence of an error, as well as a normal log indicating that the process has completed normally. Alternatively, log data can include data (e.g., variable) about the status of controller 100 and the status of a drive apparatus to be controlled by controller 100. Log data is typically generated per predetermined cycle.

Memory card interface 154 is an interface for connecting a memory card. Memory card interface 154 is configured to allow the memory card to be inserted thereinto and removed therefrom. The memory cards connectable with memory card interface 154 include a portable external storage device, such as an SD card.

Writing unit 156 sequentially reads the log data buffered to buffer 152 and sequentially writes the log data to a memory card 155 while memory card 155 is connected to memory card interface 154. Typically, the log data buffered to buffer 152 is read from buffer 152 in a first in first out (FIFO) mode or a last in, first out (LIFO) mode. In the example of FIG. 1, log data L1 to log data L4 are stored in buffer 152. In the FIFO mode, writing unit 156 obtains log data L1 to log data L4 in the order in which they are stored in buffer 152 and sequentially writes the obtained log data to memory card 155. The log data written to memory card 155 is deleted from buffer 152.

Buffer monitoring unit 158 monitors a free space of buffer 152 and periodically outputs the free space to warning unit 160. "Free space" herein refers to a remaining space obtained by subtracting the used space of buffer 152 from the capacity of buffer 152. Since free space and used space are concepts correlated with each other, "free space" is a term that can include the concept of "used space".

Since there is an upper limit to the storage capacity of memory card 155, the user needs to periodically replace memory card 155. While memory card 155 is removed, generated log data is stored in buffer 152. However, the storage capacity of buffer 152 is limited, and accordingly, existing buffered log data will be discarded if buffer 152 runs out of free space. If the user prepares memory card 155 after checking that memory card 155 has run out of free space, it takes time to replace memory card 155.

Warning unit 160 thus outputs a warning upon the free space of buffer 152 falling below a prescribed value. In one example, warning unit 160 issues a warning in the form of sound, light, notification, or the like. This allows controller 100 to output a warning to the user before buffer 152 runs out of free space. Consequently, the user can prepare a new memory card before buffer 152 runs out of space area, and can quickly replace memory card 155 with a new one. Consequently, a log data loss can be prevented.

The manner of outputting a warning is not particularly limited as long as it can be checked that buffer 152 has decreased. The manner of outputting a warning will be described below in detail.

B. Apparatus Configuration of FA System 1

Figure 2:
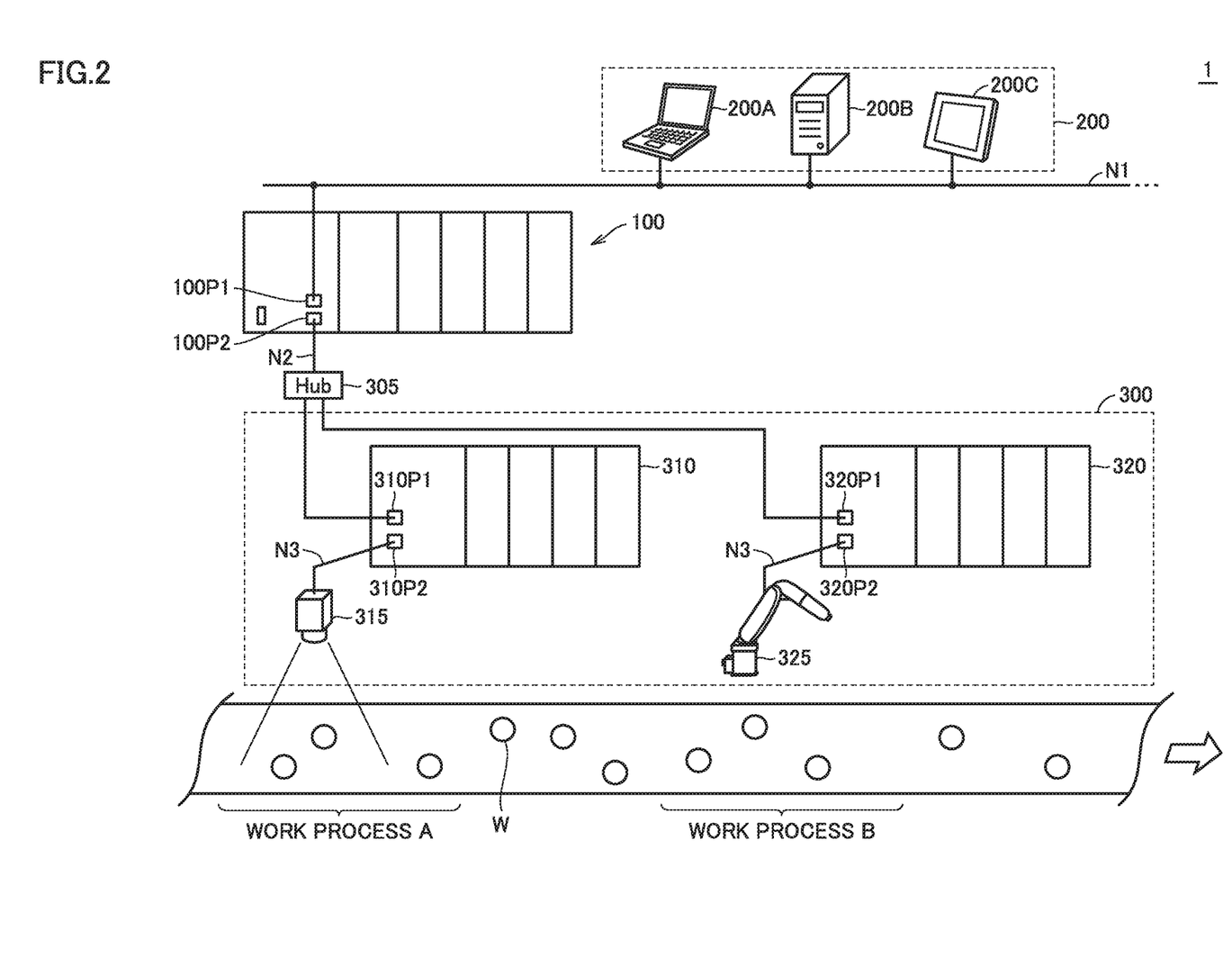
FIG. 2 schematically shows a configuration of an FA system according an embodiment.

An FA system 1 in which controller 100 is incorporated will be described with reference to FIG. 2. FIG. 2 schematically shows a configuration of FA system 1.

FA system 1 includes one or more controllers 100, one or more external apparatuses 200, and one or more drive devices 300.

Controller 100 is connectable to a plurality of networks. In the example of FIG. 2, controller 100 is connected to a high-order network N1 and a low-order network N2.

External apparatus 200 is connected to high-order network N1. External apparatus 200 includes at least one of a support apparatus 200A, a server apparatus 200B, and a display 200C.

Support apparatus 200A provides a designer with a development environment for designing a user program 110.

Support apparatus 200A is, for example, a notebook PC, a desktop PC, a tablet, or a smartphone. The designer can design user program 110 on support apparatus 200A to download user program 110 to controller 100 through network N1.

A database system, a manufacturing execution system (MES), or any other system is assumed as server apparatus 200B. The manufacturing execution system obtains information from a manufacturing apparatus or facility which is a control target to monitor and manage the entire production, and can handle order information, quality information, shipping information, or any other information. Additionally, an apparatus that provides information-type service (a process of obtaining various types of information from a control target for macroanalysis or microanalysis) may be connected to network N1.

Display 200C receives an operation from the user and outputs a command or the like corresponding to the user's operation to controller 100. Display 200C graphically presents the result of the computation or the like by controller 100. Display 200C is, for example, a human machine interface (HMI).

Drive apparatus 300 is connected to low-order network N2. Drive apparatus 300 is a collection of apparatuses for directly or indirectly performing prescribed work on workpiece W. In the example of FIG. 2, drive apparatus 300 is composed of remote IO apparatuses 310 and 320, an image sensor 315, and an arm robot 325.

Remote IO apparatus 310 has a plurality of physical communication ports. A different network is connectable to each communication port. In the example of FIG. 2, remote IO apparatus 310 has two communication ports 310P1 and 310P2. Network N2 is divided by a hub 305, with one division connected to communication port 310P1 and the other division connected to communication port 310P2. A network N3 is connected to communication port 310P2. Network N3 is preferably a field network that performs fixed-cycle communication, which guarantees a data arrival time. EtherCAT (registered trademark), CompoNet (registered trademark), and the like are known as such a field network that performs fixed-cycle communication.

Remote IO apparatus 310 controls image sensor 315 in accordance with a control command of controller 100. Image sensor 315 sequentially takes an image of workpiece W transported on a conveyor in accordance with the control command received from remote IO apparatus 310, and performs a predetermined image process on the obtained image. Thus, image sensor 315 sequentially performs, for example, a quality inspection of workpiece W transported on the conveyor. The result of the inspection by image sensor 315 is sequentially transmitted to controller 100 through remote IO apparatus 310.

Remote IO apparatus 320 has a plurality of physical communication ports. A different network is connectable to each communication port. In the example of FIG. 2, remote IO apparatus 320 has two communication ports 320P1 and 320P2. Network N2 is divided by hub 305, with one division connected to communication port 310P2. Network N3 is connected to communication port 320P2. Network N3 is preferably a field network that performs fixed-cycle communication, which guarantees a data arrival time. EtherCAT, CompoNet, and the like are known as such a field network that performs fixed-cycle communication.

Remote IO apparatus 320 controls arm robot 325 in accordance with a control command of controller 100. In one example, controller 100 outputs, to remote IO apparatus 320, a control command for causing arm robot 325 to perform prescribed work (work process B) in accordance with an inspection process (work process A) by image sensor 315. Remote IO apparatus 320 controls arm robot 325 in accordance with the control command. In one example, remote IO apparatus 320 provides a control command to eliminate a workpiece W which has been determined as having poor inspection quality from the conveyor. The status (e.g., a position or an angle of each joint) of arm robot 325 is sequentially fed back from remote IO apparatus 320 to controller 100.

C. Warning Process

As described with reference to FIG. 1, log data is saved in memory card 155 connected to controller 100. The log data includes, for example, an error log generated during the process of controller 100, and an error log generated during communication with external apparatus 200 or drive apparatus 300. While memory card 155 is removed, the generated log data is stored in buffer 152 of controller 100. When the free space of buffer 152 decreases, warning unit 160 outputs a warning.

Figure 3:
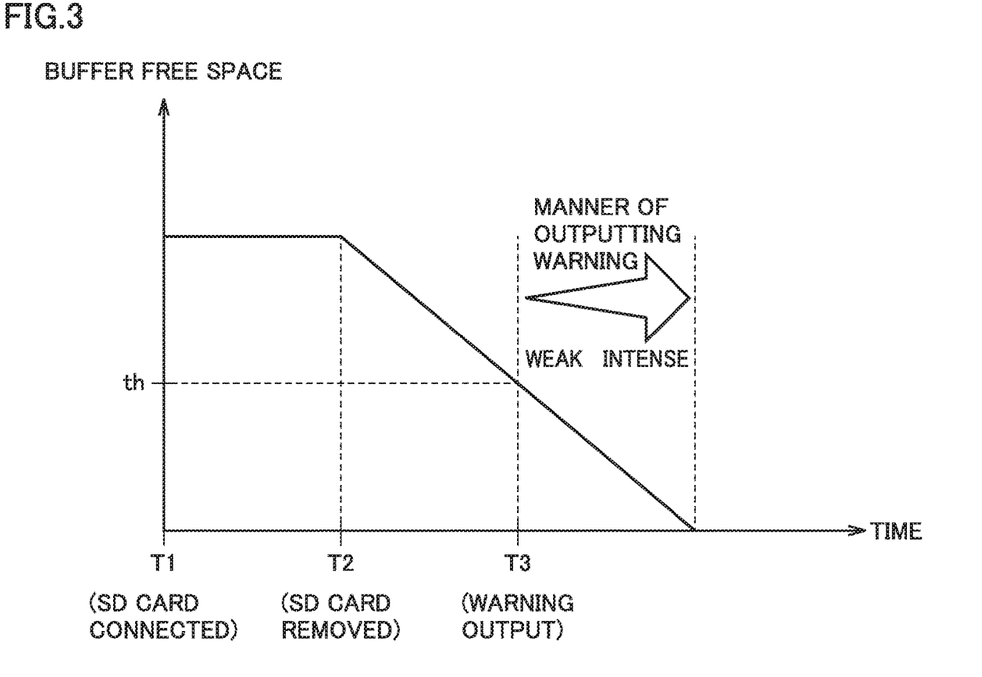
FIG. 3 shows an example transition of a free space of a buffer.

A warning process by warning unit 160 will now be described with reference to FIG. 3. FIG. 3 shows an example transition of a free space in buffer 152. The free space in buffer 152 will be merely referred to as "buffer free space" as well.

It is assumed that at, a time T1, memory card 155 has been connected to memory card interface 154 of controller 100. While memory card 155 is connected, controller 100 sequentially reads log data from buffer 152 and writes the log data to memory card 155. Alternatively, every time a certain amount of log data is stored in buffer 152, controller 100 reads the log data from buffer 152 and writes the log data to memory card 155. The log data written to memory card 155 is deleted from buffer 152.

It is assumed that, at a time T2, the user has removed memory card 155 from memory card interface 154 of controller 100 in order to replace memory card 155. Controller 100 also stores generated log data in buffer 152 continuously after the removal of memory card 155. As a result, the buffer free space keeps decreasing after time T2.

Warning unit 160 compares the buffer free space with a predetermined threshold th to determine whether to output a warning. Threshold th may be set in advance or may be set as appropriate by the user. It is assumed that, at a time T3, the buffer free space has fallen below threshold th. Thereupon, warning unit 160 outputs a warning.

The buffer free space keeps decreasing further after time T3. At this time, warning unit 160 intensifies the manner of outputting a warning as the buffer free space decreases. This allows the user to intuitively grasp the free space of buffer 152. Note that a warning may be changed in stages in accordance with the buffer free space or may be changed linearly in accordance with the buffer free space. In one example, the relationship between a buffer free space and a warning output value may be defined as table information, or may be defined by an expression where the buffer free space is an explanatory variable and the warning output value is a target variable.

A warning method by warning unit 160 may be any appropriate warning means. In one example, the warning by warning unit 160 includes at least one of a warning by light, a warning by sound, and a warning by notification.

Warning by light is enabled by, for example, a light emitting diode (LED) provided in controller 100. The LED is configured to emit light in a prescribed emission pattern upon the buffer free space falling below threshold th. Examples of the emission pattern by the LED include blinking and lighting in a prescribed color (e.g., red). Typically, the LED is configured to increase a blinking rate or emission intensity as the buffer free space decreases. The user can check how the LED emits light to visually recognize that the buffer free space has decreased.

Warning by sound is enabled by, for example, a speaker provided in controller 100. The speaker is configured to issue a prescribed warning sound upon the buffer free space falling below threshold th. Examples of the warning sound include a predetermined beep and a predetermined voice. Preferably, the speaker is configured to increase the volume of the warning sound, the pitch of the warning sound, the ON/OFF rate of the warning sound, and the like as the buffer free space decreases. The user can aurally recognize, based on the sound from the speaker, that the buffer free space has decreased.

The warning by notification is enabled by, for example, a notification function of controller 100. The notification function transmits, to another communication apparatus (e.g., external apparatus 200 shown in FIG. 2), a warning notification, such as an email, upon the buffer free space falling below threshold th. External apparatus 200 provides a push notification as the warning notification upon receipt of the warning notification from controller 100. Examples of the warning notification include a message indicating that the buffer free space has decreased, the size of the buffer free space, and a predicted time until the buffer runs out of free space. The user can check push notification to recognize that the buffer free space has decreased.

In another warning method, warning unit 160 changes the value of a system variable indicating the error status of controller 100 to a prescribed value. In one example, when the buffer free space is greater than a threshold th2 (>threshold th), controller 100 sets the value of the system variable to "High". When the buffer free space is greater than or equal to threshold th and less than or equal to threshold th2, controller 100 sets the value of the system variable to "Mid". When the buffer free space falls below threshold th, controller 100 sets the value of the system variable to "Low".

D. Temporal Saving Process

While memory card 155 is removed from controller 100, controller 100 stores newly received log data in buffer 152, as described above. When the buffer free space has run out, upon generation of new log data, controller 100 fails to write the new log data to buffer 152.

Then, controller 100 temporarily saves log data which has overflowed from buffer 152 in the internal storage device. When a new memory card is connected to controller 100, controller 100 moves the log data saved in the internal storage device to the newly connected memory card. Consequently, a log data loss can be prevented even when buffer 152 has run out free space during replacement of memory card 155.

Figure 4:
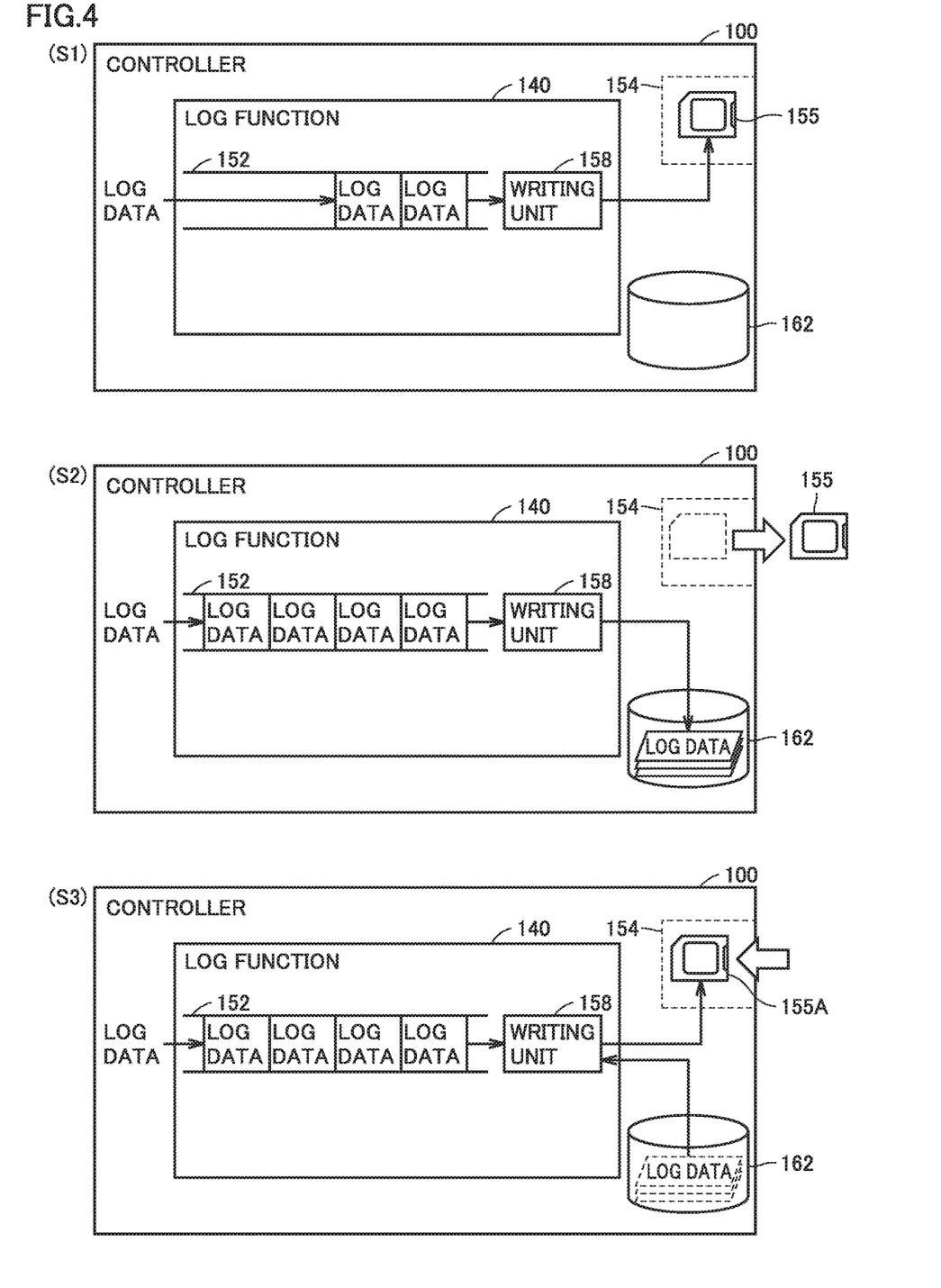
FIG. 4 shows a flow of a process of temporarily saving log data.

A process of temporarily saving log data when the buffer free space has run out will now be described with reference to FIG. 4. FIG. 4 shows a flow of the process of temporarily saving log data.

As shown in FIG. 4, controller 100 includes a log function 140, memory card interface 154, and an internal storage device 162. Log function 140 includes buffer 152 (see FIG. 1) described above and writing unit 156 (see FIG. 1) described above. Internal storage device 162 is a storage area which is different from buffer 152 and is provided for temporarily saving log data. This storage area may be any appropriate storage area in controller 100. Internal storage device 162 is, for example, a nonvolatile memory 108 (see FIG. 5), which will be described below, or any other storage device in controller 100.

It is assumed that, at step S1, memory card 155 is connected to memory card interface 154. In this case, writing unit 156 sequentially reads log data stored in buffer 152 and sequentially writes the read log data to memory card 155.

It is assumed that, at step S2, memory card 155 is removed from memory card interface 154. While memory card 155 is not connected to memory card interface 154, writing unit 156 sequentially reads log data stored in buffer 152 and sequentially buffers the log data to internal storage device 162. This allows the log data stored in buffer 152 to be temporarily saved in internal storage device 162. Typically, log data is read from buffer 152 in the FIFO mode or LIFO mode. Preferably, log data is stored in buffer 152 until the free space of buffer 152 runs out and is stored in internal storage device 162 after the free space of buffer 152 runs out. Log data is stored in internal storage device 162 in this manner, thus preventing a log data loss while memory card 155 is removed.

It is assumed that, at step S3, a memory card 155A is connected to controller 100. Memory card 155A may be a new memory card different from memory card 155 or may be memory card 155 after the log data therein has been moved. Writing unit 156 writes log data temporarily buffered to internal storage device 162 to memory card 155A upon connection of a new memory card 155A to memory card interface 154. This allows the log data temporarily saved while the memory card is removed to be stored in memory card 155A. After that, the log data temporarily buffered to internal storage device 162 is deleted.

Although the above has described the example in which the log data which has overflowed from buffer 152 is temporarily saved in internal storage device 162, such a manner is merely a preferred one and is not an essential one. For example, when buffer free space runs out, controller 100 may delete newly generated log data. Alternatively, controller 100 may delete the oldest log data among pieces of log data stored in buffer 152 from buffer 152 in order to store newly generated log data in buffer 152.

E. Hardware Configuration of Controller 100

Figure 5:
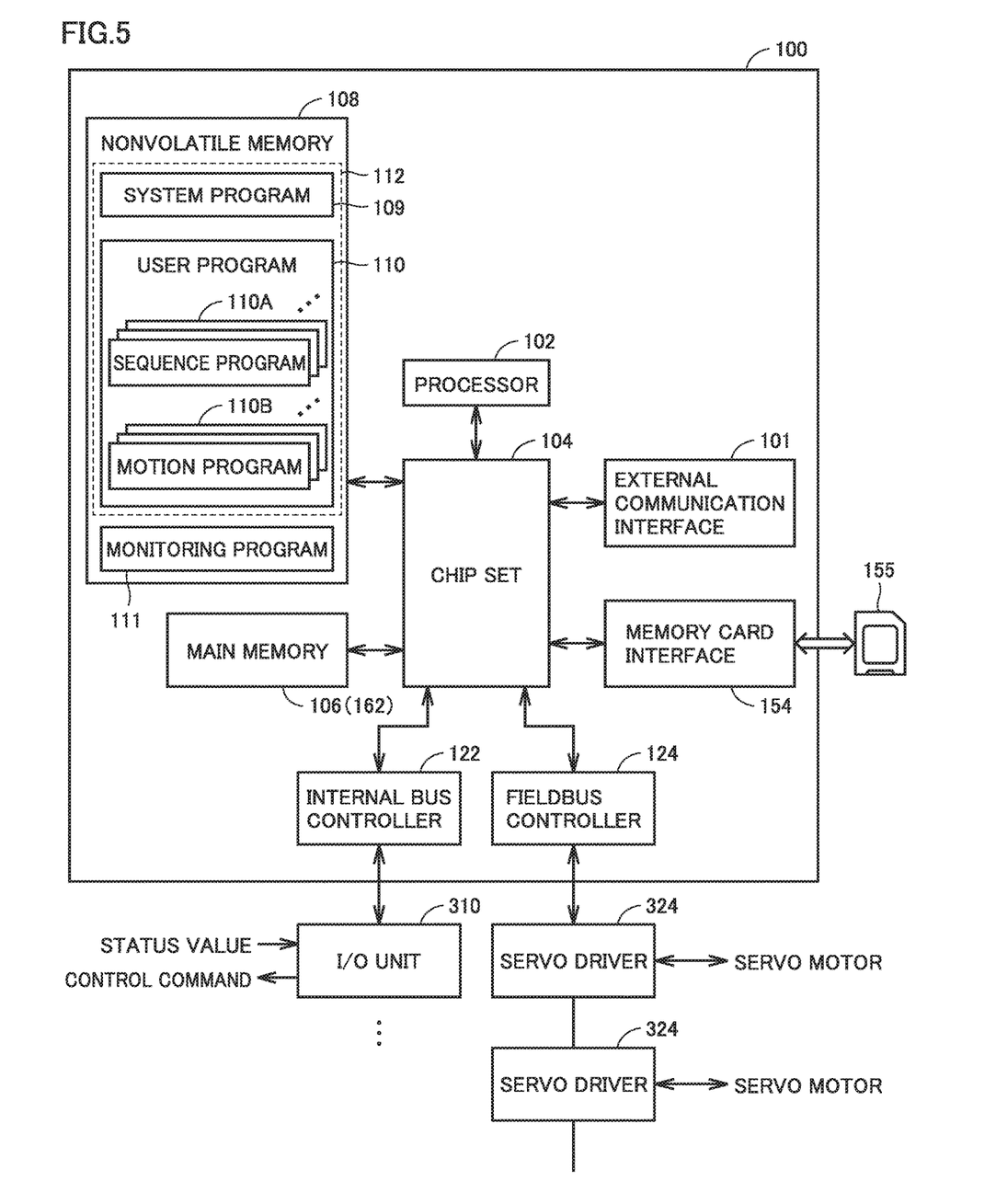
FIG. 5 schematically shows an example hardware configuration of a controller according to an embodiment.

The hardware configuration of controller 100 will be described with reference to FIG. 5. FIG. 5 schematically shows an example hardware configuration of controller 100.

Controller 100 includes an external communication interface 101, a processor 102, such as a central processing unit (CPU) or a micro-processing unit (MPU), a chip set 104, a volatile main memory 106, nonvolatile memory 108, an internal bus controller 122, a fieldbus controller 124, and memory card interface 154.

External communication interface 101 controls data exchange through various wired/wireless networks.

Processor 102 reads a control program 112 stored in nonvolatile memory 108 such as a flash memory, and executes control program 112 by deploying it to main memory 106, thereby appropriately controlling a servo driver 324 or the like. Control program 112 includes various programs for controlling controller 100. In one example, control program 112 includes a system program 109, a user program 110, a monitoring program 111, and the like. System program 109 includes an instruction code for providing basic functions of controller 100, such as data I/O processing and execution timing control. User program 110 is designed appropriately in accordance with a control target and includes a sequence program 110A for performing sequence control and a motion program 110B for performing motion control. Monitoring program 111 includes an instruction code for implementing warning process described above. Control program 112 is, for example, a PLC program described in ladder language or structured text (ST) language.

Chip set 104 controls each component to implement the process as controller 100 in its entirety.

Internal bus controller 122 is an interface that exchanges data with various devices coupled with controller 100 through an internal bus. As an example of such devices, remote IO apparatus 310 is connected.

Fieldbus controller 124 is an interface that exchanges data with various devices coupled with controller 100 through a fieldbus. As an example of such devices, servo driver 324 is connected. Servo driver 324 controls a servo motor in accordance with a command from controller 100. Consequently, various drive apparatuses (e.g., arm robot 325) connected to the servo motor are driven.

Internal bus controller 122 and fieldbus controller 124 can provide any appropriate command to the device connected thereto and also obtain any appropriate data (including a measured value) managed by the device. Internal bus controller 122 and/or fieldbus controller 124 also function(s) as an interface for exchanging data with servo driver 324.

Memory card interface 154 is configured to allow a memory card 155 (e.g., SD card), which is an example external storage device medium, to be inserted thereinto and removed therefrom. Controller 100 reads and writes data from and to memory card 155 through memory card interface 154.

F. Functional Configuration of Controller 100

Figure 6:
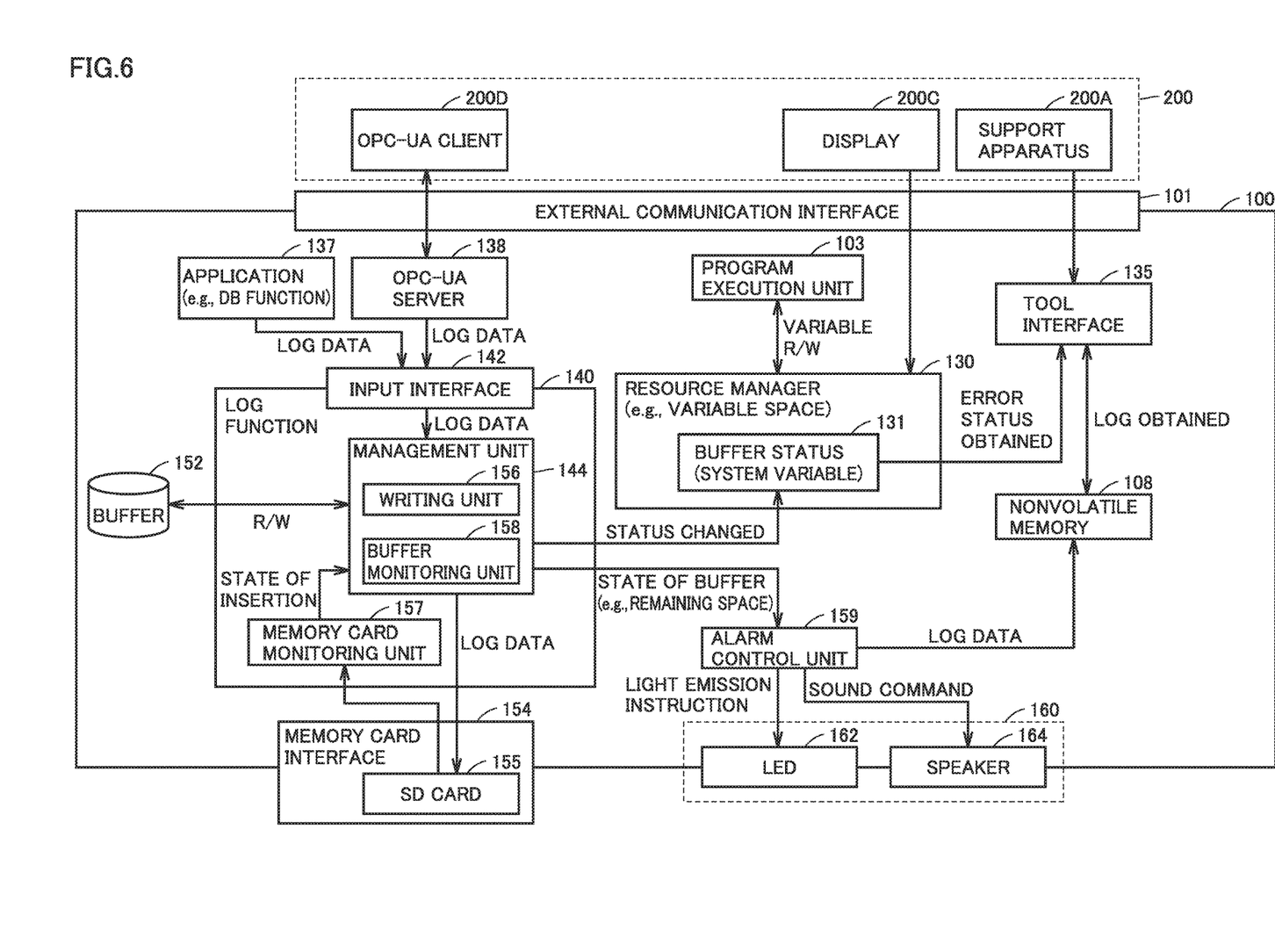
FIG. 6 shows an example functional configuration of a controller according to an embodiment.

Functions of controller 100 will be described with reference to FIG. 6. FIG. 6 shows an example functional configuration of controller 100.

Controller 100 includes external communication interface 101, a program execution unit 103, nonvolatile memory 108, a resource manager 130, a tool interface 135, an application 137 having a DB function, an object linking and embedding for process control unified architecture (OPC-UA) server 138, log function 140, buffer 152, memory card interface 154, an alarm control unit 159, and warning unit 160.

External communication interface 101 communicates with external apparatus 200. External apparatus 200 is, for example, support apparatus 200A, display 200C, and an OPC-UA client 200D.

"Sysmac Studio", which is a development tool of user program 110 (see FIG. 5), is installed in support apparatus 200A. Tool interface 135 receives control program 112 designed on the developing tool through external communication interface 101. Tool interface 135 also transmits error information or log data of controller 100 to support apparatus 200A through external communication interface 101.

External communication interface 101 communicates with OPC-UA client 200D in conformity with the OPC-UA communication standard. The OPC-UA is a communication standard that can implement data exchange independently of the type of a vendor or an operating system (OS). For communication in conformity with OPC-UA, controller 100 needs to function as OPC-UA server 138, and also, external apparatus 200 needs to function as OPC-UA client 200D.

Upon acceptance of an instruction to execute control program 112, program execution unit 103 deploys various types of data required for executing control program 112 (see FIG. 5) to main memory 106 (see FIG. 5) and controls various drive apparatuses in accordance with control program 112.

Display 200C communicates with controller 100 through external communication interface 101. Display 200C accesses variables managed by resource manager 130 and graphically represents the variables. "Variable" herein refers to data indicating the status of controller 100 or drive apparatus 300.

Resource manager 130 holds an entity of each variable in controller 100 and is in charge of management of each variable and read/write of each variable. In one example, when receiving a variable read instruction (acquisition instruction), resource manager 130 accesses a variable which is a read target and transmits the variable to a source of the read instruction. Also, when receiving a variable write instruction, resource manager 130 accesses a variable which is a write target and rewrites the variable with a designated value. The variables managed by resource manager 130 include a variable in control program 112 and a system variable 131 indicating the status of buffer 152.

Log function 140 includes an input interface 142, a management unit 144, and a memory card monitoring unit 157. Input interface 142 accepts log data which is a storage target. The log data which is a storage target includes log data in application 137 having a DB function and log data in OPC-UA server 138. The log data which is a storage target, accepted by input interface 142, is output to management unit 144.

Management unit 144 is a function implemented by processor 102 of controller 100. Management unit 144 manages buffer 152. More specifically, management unit 144 writes log data accepted by input interface 142 to buffer 152 or deletes log data written to memory card 155. Management unit 144 includes writing unit 156 and buffer monitoring unit 158. The functions of writing unit 156 and buffer monitoring unit 158 are as described above, description of which will not be repeated.

Memory card monitoring unit 157 is a function implemented by processor 102 of controller 100. Memory card monitoring unit 157 monitors a state in which memory card 155 is inserted into memory card interface 154. The state of insertion of a monitoring target includes, for example, the state in which memory card 155 is inserted into memory card interface 154 and the state in which memory card 155 is removed from memory card interface 154. The state of insertion detected by memory card monitoring unit 157 is output to management unit 144.

Alarm control unit 159 controls a manner of outputting a warning by warning unit 160. Warning unit 160 includes an LED 162 and a speaker 164. Alarm control unit 159 causes warning unit 160 to output a warning upon the free space of buffer 152 falling below a prescribed value. The manner of outputting a warning by warning unit 160 is as described above, description of which will not be repeated.

G. Overall Flow

Figure 7:
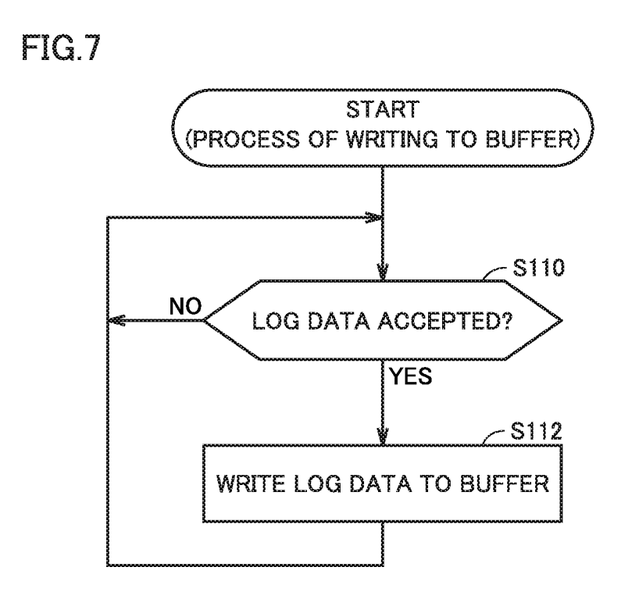
FIG. 7 is a flowchart showing a process of writing log data accepted as a save target to a buffer.
Figure 8:
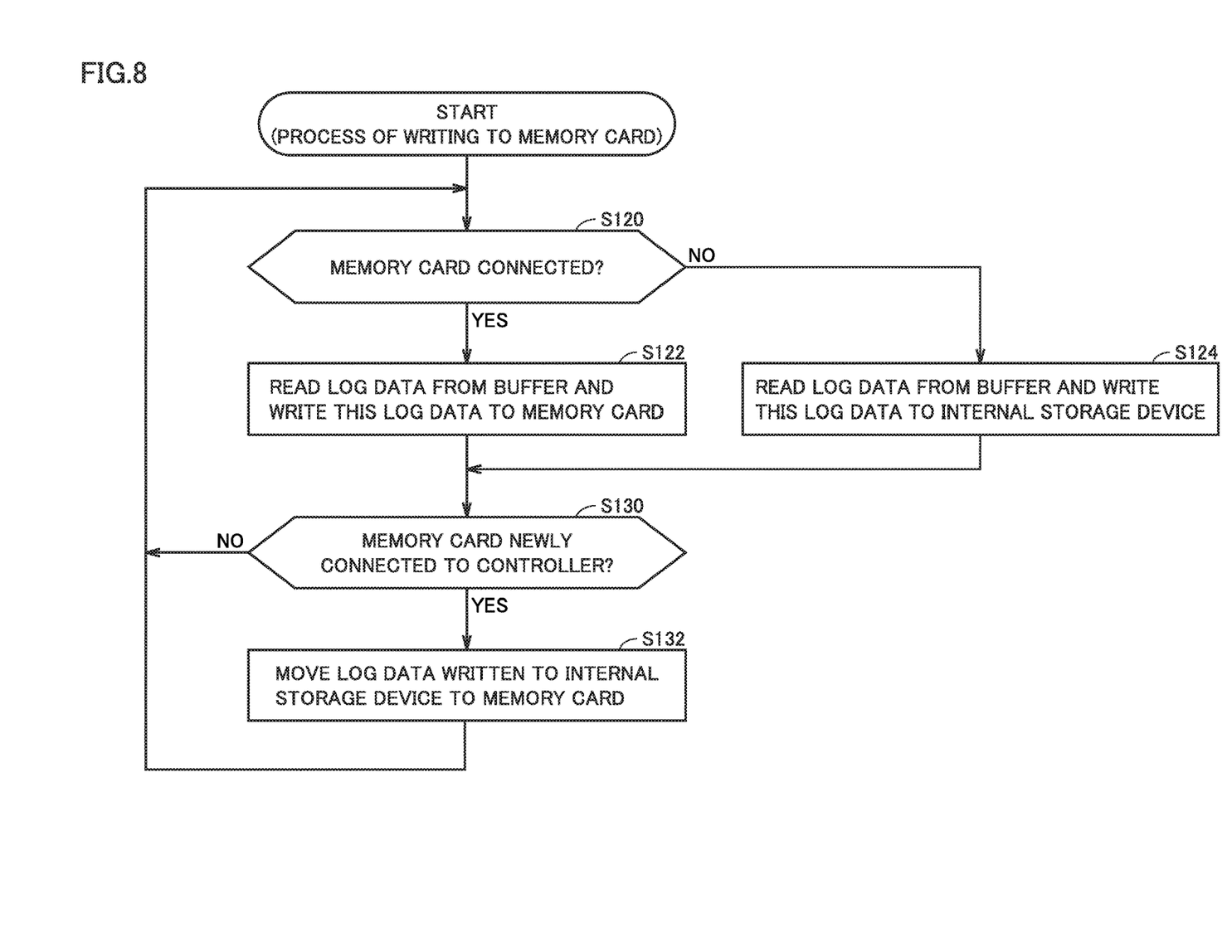
FIG. 8 is a flowchart showing a process of writing log data read from a buffer to a memory card.
Figure 9:
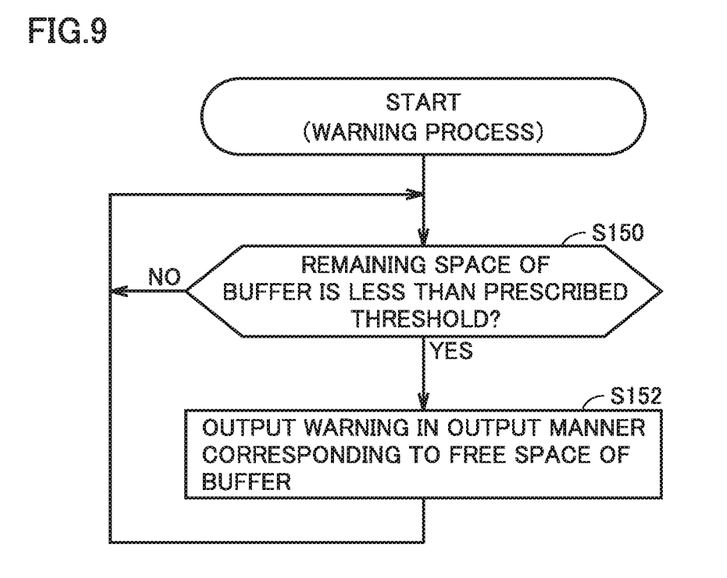
FIG. 9 is a flowchart showing a warning process.

A control structure of controller 100 will be described with reference to FIGS. 7 to 9. FIG. 7 is a flowchart showing the process of writing log data accepted as a storage target to buffer 152 (see FIG. 1). FIG. 8 is a flowchart showing the process of writing log data read from buffer 152 to memory card 155. FIG. 9 is a flowchart showing the warning process.

The process shown in FIG. 7, the process shown in FIG. 8, and the process shown in FIG. 9 are performed in parallel. The processes are implemented as processor 102 (see FIG. 5) of controller 100 executes monitoring program 111 (see FIG. 5) described above. In another aspect, some or all of the processes may be executed by a circuit element or any other hardware.

The following will describe the process flows shown in the respective figures in order with reference to FIGS. 7 to 9.

(G1. Process of Writing to Buffer)

First, the flow of the process of writing log data accepted as a storage target to buffer 152 will be described with reference to FIG. 7.

At step S110, processor 102 determines whether it has accepted log data which is a storage target. Typically, processor 102 accepts log data which is a storage target per predetermined cycle. Processor 102 switches control to step S112 when determining that it has accepted log data which is a storage target (YES at step S110). Otherwise (NO at step S110), processor 102 performs the process of step S110 again.

At step S112, processor 102 writes the log data to buffer 152. Typically, the log data is written to buffer 152 per predetermined cycle.

(G2. Process of Writing to Memory Card)

Next, the flow of the process of writing the log data read from buffer 152 to memory card 155 will be described with reference to FIG. 8.

At step S120, processor 102 determines whether memory card 155 is connected to controller 100 as memory card monitoring unit 157 (see FIG. 6) described above. Processor 102 switches control to step S122 when determining that memory card 155 is connected to controller 100 (YES at step S120). Otherwise (NO at step S120), processor 102 switches control to step S124.

At step S122, processor 102 reads log data from buffer 152 and writes the log data to memory card 155 as writing unit 156 (see FIG. 6) described above.

At step S124, processor 102 reads log data from buffer 152 and writes the log data to internal storage device 162 (see FIG. 4) as writing unit 156 described above.

At step S130, processor 102 determines whether memory card 155 is newly connected to controller 100 as memory card monitoring unit 157 described above. In other words, processor 102 determines whether the state in which memory card 155 is removed from controller 100 has been shifted to the state in which memory card 155 is connected to controller 100. Processor 102 switches control to step S132 when determining that memory card 155 has been newly connected to controller 100 (YES at step S130). Otherwise (NO at step S130), processor 102 returns control to step S120.

(G3. Warning Process)

Next, the flow of the warning process by controller 100 will be described with reference to FIG. 9.

At step S150, processor 102 obtains a free space of buffer 152 and determines whether the free space is less than prescribed threshold th (see FIG. 3) as buffer monitoring unit 158 (see FIG. 6) described above. Processor 102 switches control to step S152 when determining that the free space of buffer 152 is less than prescribed threshold th (YES at step S150). Otherwise (NO at step S150), processor 102 performs the process of step S150 again.

At step S152, processor 102 causes warning unit 160 to output a warning in an output manner corresponding to the free space of buffer 152 as alarm control unit 159 (see FIG. 6) described above. Thereupon, warning unit 160 outputs a warning. The manner of outputting a warning by warning unit 160 is as described above, description of which will not be repeated.

H. Concluding Notes

Controller 100 sequentially writes log data which is a storage target to buffer 152, as described above. In parallel with this, controller 100 sequentially reads the log data from buffer 152 and sequentially writes the log data to memory card 155 while memory card 155 is connected to memory card interface 154. Controller 100 periodically monitors the free space of buffer 152, and upon the free space falling below a prescribed value, outputs a warning.

As a warning is output before buffer 152 runs out free space, controller 100 can notify the user that buffer 152 is running out of free space. This allows the user to prepare a new memory card before buffer 152 runs out of free space to quickly replace memory card 155 with a new one. Consequently, a log data loss can be prevented.

I. Additional Notes

As described above, the present embodiment includes the following disclosure.

[Configuration 1]

A control apparatus comprising:

a buffer (152) for buffering log data sequentially generated;

an interface unit (154) connectable with an external storage device (155);

a writing unit (156) for sequentially reading the log data buffered to the buffer (152) and sequentially writing the log data to the external storage device (155) while the external storage device (155) is connected to the interface unit (154);

a monitoring unit (158) for monitoring a free space of the buffer (152); and a warning unit (160) for outputting a warning upon the free space falling below a prescribed value.

[Configuration 2]

The control apparatus according to configuration 1, wherein the warning unit (160) intensifies a manner of outputting the warning as the free space decreases.

[Configuration 3]

The control apparatus according to configuration 1 or 2, wherein the control apparatus (100) further includes an internal storage device (162), and while the external storage device (155) is not connected to the interface unit (154), the writing unit (156) sequentially reads log data stored in the buffer (152) and buffers the log data to the internal storage device (162).

[Configuration 4]

The control apparatus according to configuration 3, wherein upon connection of a new external storage device (155) to the interface unit (154), the writing unit (156) writes the log data buffered to the internal storage device (162) to the new external storage device (155).

[Configuration 5]

The control apparatus according to any one of configurations 1 to 4, wherein the warning includes at least one of a warning by light, a warning by sound, and a warning by notification.

[Configuration 6]

A method of monitoring a buffer (152) included in a control apparatus (100), the method comprising:

buffering log data sequentially generated to a buffer (152) of the control apparatus (100) (S112);

while an external storage device (155) is connected to an interface unit (154) of the control apparatus (100), sequentially reading log data buffered to the buffer (152) and sequentially writing the log data to the external storage device (155) (S122);

monitoring a free space of the buffer (152) (S150); and outputting a warning upon the free space falling below a prescribed value (S152).

[Configuration 7]

A monitoring program for a buffer (152) included in a control apparatus (100), the monitoring program causing the control apparatus (100) to perform buffering log data sequentially generated to a buffer (152) of the control apparatus (100) (S112);

while an external storage device (155) is connected to an interface unit (154) of the control apparatus (100), sequentially reading the log data buffered to the buffer (152) and sequentially writing the log data to the external storage device (155) (S122);

monitoring a free space of the buffer (152) (S150); and outputting a warning upon the free space falling below a prescribed value (S152).

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 FA system, 100 controller, 101 external communication interface, 102 processor, 103 program execution unit, 104 chip set, 106 main memory, 108 nonvolatile memory, 109 system program, 110 user program, 110A sequence program, 110B motion program, 111 monitoring program, 112 control program, 122 internal bus controller, 124 fieldbus controller, 130 resource manager, 131 system variable, 135 tool interface, 137 application, 138 OPC-UA server, 140 log function, 142 input interface, 144 management unit, 152 buffer, 154 memory card interface, 155, 155A memory card, 156 writing unit, 157 memory card monitoring unit, 158 buffer monitoring unit, 159 alarm control unit, 160 warning unit, 162 internal storage device, 164 speaker, 200 external apparatus, 200A support apparatus, 200B server apparatus, 200C display, 200D OPC-UA client, 300 drive apparatus, 305 hub, 310, 320 remote IO apparatus, 310P1, 310P2, 320P1, 320P2 communication port, 315 image sensor, 324 servo driver, 325 arm robot.

The invention claimed is:

1. A control apparatus comprising:
a buffer for buffering log data sequentially generated;
an interface unit connectable with an external storage device;
a writing unit for sequentially reading the log data buffered to the buffer and sequentially writing the log data to the external storage device while the external storage device is connected to the interface unit;
a monitoring unit for monitoring a free space of the buffer;
a warning unit for outputting a warning upon the free space falling below a prescribed value; and
an internal storage device, wherein:
while the external storage device is not connected to the interface unit, the writing unit sequentially reads the log data stored in the buffer and buffers the log data to the internal storage device; and
based on an external storage device being newly connected to the interface unit, the writing unit writes the log data, buffered in the internal storage device while the external device is not connected to the interface unit, to the newly connected external storage device, changes the output destination of the log data from the internal storage device to the newly connected external storage device, and does not buffer the log data in the internal storage device.

2. The control apparatus according to claim 1, wherein the warning includes at least one of a warning by light, a warning by sound, and a warning by notification.

3. A method of monitoring a buffer included in a control apparatus, the method comprising:
buffering log data sequentially generated to a buffer of the control apparatus;
while an external storage device is connected to an interface unit of the control apparatus, sequentially reading log data buffered to the buffer and sequentially writing the log data to the external storage device;
monitoring a free space of the buffer;
outputting a warning upon the free space falling below a prescribed value;
while the external storage device is not connected to the interface unit, sequentially reading log data stored in the buffer and buffering the log data to the internal storage device of the control apparatus; and
based on an external storage device being newly connected to the interface unit, writing the log data, buffered in the internal storage device while the external device is not connected to the interface unit, to the newly connected external storage device, changing the output destination of the log data from the internal storage device to the newly connected external storage device, and not buffering the log data in the internal storage device.

4. A non-transitory storage medium storing thereon a monitoring program for a buffer included in a control apparatus, the monitoring program causing the control apparatus to perform operations comprising:
buffering log data sequentially generated to a buffer of the control apparatus;
while an external storage device is connected to an interface unit of the control apparatus, sequentially reading the log data buffered to the buffer and sequentially writing the log data to the external storage device;
monitoring a free space of the buffer;
outputting a warning upon the free space falling below a prescribed value;
while the external storage device is not connected to the interface unit, sequentially reading log data stored in the buffer and buffering the log data to the internal storage device of the control apparatus; and
based on an external storage device being newly connected to the interface unit, writing the log data, buffered in the internal storage device while the external device is not connected to the interface unit, to the newly connected external storage device, changing the output destination of the log data from the internal storage device to the newly connected external storage device, and not buffering the log data in the internal storage device.

5. The control apparatus according to claim 1, wherein, based on the external storage device being newly connected to the interface unit, the writing unit deletes the log data written to the newly connected external storage device from the internal storage device.

6. The method according to claim 3, further comprising, based on the external storage device being newly connected to the interface unit, deleting the log data written to the newly connected external storage device from the internal storage device.

7. The non-transitory computer-readable storage medium according to claim 4, further comprising, based on the external storage device being newly connected to the interface unit, deleting the log data written to the newly connected external storage device from the internal storage device.

\* \* \* \* \*